US010563645B2

(12) United States Patent
Bagagli et al.

(10) Patent No.: US 10,563,645 B2
(45) Date of Patent: Feb. 18, 2020

(54) DEVICES AND METHODS FOR ACTUATING VALVES

(71) Applicant: NUOVO PIGNONE S.p.A., Florence (IT)

(72) Inventors: Riccardo Bagagli, Florence (IT); Leonardo Tognarelli, Florence (IT)

(73) Assignee: NUOVO PIGNONE SPA, Florence (IT)

( * ) Notice: Subject to any disclaimer, the term of this patent is extended or adjusted under 35 U.S.C. 154(b) by 543 days.

(21) Appl. No.: 14/369,100

(22) PCT Filed: Dec. 14, 2012

(86) PCT No.: PCT/EP2012/075585
§ 371 (c)(1),
(2) Date: Jun. 26, 2014

(87) PCT Pub. No.: WO2013/098097
PCT Pub. Date: Jul. 4, 2013

(65) Prior Publication Data
US 2014/0377110 A1 Dec. 25, 2014

(30) Foreign Application Priority Data

Dec. 27, 2011 (IT) .............................. MI2011A2391

(51) Int. Cl.
*F04B 39/08* (2006.01)
*F04B 7/00* (2006.01)
(Continued)

(52) U.S. Cl.
CPC ............ *F04B 39/08* (2013.01); *F04B 7/0061* (2013.01); *F04B 7/0069* (2013.01); *F04B 39/10* (2013.01);
(Continued)

(58) Field of Classification Search
CPC ........ F16K 31/047; F16K 31/52; F16K 31/44; F04B 39/08; F04B 39/1013; F04B 39/10;
(Continued)

(56) References Cited

U.S. PATENT DOCUMENTS

| 979,811 | A | * | 12/1910 | Wallem | ................... | F16K 1/308 |
| | | | | | | 137/512.1 |
| 1,475,826 | A | * | 11/1923 | Hoffman | ................. | F16K 15/08 |
| | | | | | | 137/454.4 |

(Continued)

FOREIGN PATENT DOCUMENTS

| CN | 101725505 A | 6/2010 |
| EP | 2110592 A2 | 10/2009 |

(Continued)

OTHER PUBLICATIONS

Autoblog, "Valeo has customers for camless engine with smart valve actuation", http://green.autoblog.com/2006/12/12/valeo-has-customers-for-camless-engine-with-smart-valve-actuati/, Dec. 12, 2006.

(Continued)

*Primary Examiner* — Nathan C Zollinger
(74) *Attorney, Agent, or Firm* — Baker Hughes Patent Organization

(57) ABSTRACT

Apparatuses and methods overcoming the technical challenges in actuating valves of reciprocating compressors used in oil and gas industry are provided. A valve assembly includes an actuator, a shaft, a collar and a thrust bushing. The actuator is configured to generate a displacement. The shaft configured to receive a rotating motion caused by the displacement and to penetrate inside a compressor body of the reciprocating compressor. The collar is located close to a location where the shaft penetrates inside the compressor body. The thrust bushing is located between the collar and (Continued)

the compressor body. The rotating motion actuates a valve closing member of a valve inside the compressor body.

10 Claims, 11 Drawing Sheets

(51) Int. Cl.
*F04B 39/10* (2006.01)
*F04B 39/12* (2006.01)
*F16K 31/44* (2006.01)

(52) U.S. Cl.
CPC ............ *F04B 39/121* (2013.01); *F16K 31/44* (2013.01); *Y10T 29/49238* (2015.01)

(58) Field of Classification Search
CPC .. F04B 39/121; F04B 5/02; F04B 7/00; F04B 7/0061; F04B 7/0057; F04B 7/0069; Y10T 29/49238
USPC .................................................. 251/260, 261
See application file for complete search history.

(56) References Cited

U.S. PATENT DOCUMENTS

| | | | | |
|---|---|---|---|---|
| 1,776,086 | A * | 9/1930 | Ready | F16C 19/54 251/260 |
| 2,620,817 | A * | 12/1952 | Blaydes | F16K 1/306 137/322 |
| 2,815,968 | A * | 12/1957 | Coffman | F16J 15/36 277/377 |
| 3,155,309 | A | 11/1964 | Foster | |
| 3,514,076 | A * | 5/1970 | Wheatley | F16K 15/03 137/527.8 |
| 4,612,886 | A * | 9/1986 | Hansen | F01L 7/028 123/190.14 |
| 5,996,544 | A | 12/1999 | Bartos | |
| 6,772,783 | B2 * | 8/2004 | Etheridge | F16K 3/24 137/15.18 |
| 7,241,116 | B2 | 7/2007 | Tarutani et al. | |
| 8,047,766 | B2 | 11/2011 | Goll | |
| 2009/0056479 | A1 | 3/2009 | Nogami et al. | |
| 2010/0086415 | A1 | 4/2010 | Spiegl et al. | |
| 2011/0232405 | A1 | 9/2011 | Morin et al. | |

FOREIGN PATENT DOCUMENTS

| | | | | |
|---|---|---|---|---|
| FR | 1275130 | | 11/1961 | |
| GB | 190945 | A * | 1/1923 | ............ F04B 49/243 |
| GB | 459143 | | 1/1937 | |
| GB | 2195395 | A | 4/1988 | |
| JP | 4845915 | A | 6/1973 | |
| JP | 6075694 | A | 5/1985 | |
| JP | 046580 | U | 1/1992 | |
| JP | 2004183609 | A | 7/2004 | |
| JP | 2004353533 | A | 12/2004 | |
| JP | 2007032463 | A | 2/2007 | |
| JP | 3913780 | B2 | 5/2007 | |
| SU | 530990 | A | 10/1976 | |
| WO | 2009146222 | A1 | 12/2009 | |

OTHER PUBLICATIONS

Unofficial English translation of Office Action issued in connection with corresponding RU Application No. 2014124747 dated Aug. 25, 2016.
Unofficial English translation of Office Action issued in connection with corresponding CN Application No. 201280064963.7 dated Aug. 25, 2015.
International Search Report and Written Opinion dated Apr. 24, 2013 which was issued in connection with the PCT Patent Application No. PCT/EP12/075585 which was filed on Dec. 14, 2012.
Italian Search Report and Written Opinion dated Aug. 16, 2012 which was issued in connection with the Italian Patent Application No. MI2011A002391 which was filed on Dec. 27, 2011.
Unofficial English translation of Office Action issued in connection with corresponding JP Application No. 2014-549409 dated Oct. 25, 2016.
Unofficial English Translation of Japanese Office Action issued in connection with corresponding JP Application No. 014549409 dated Mar. 16, 2017.

* cited by examiner

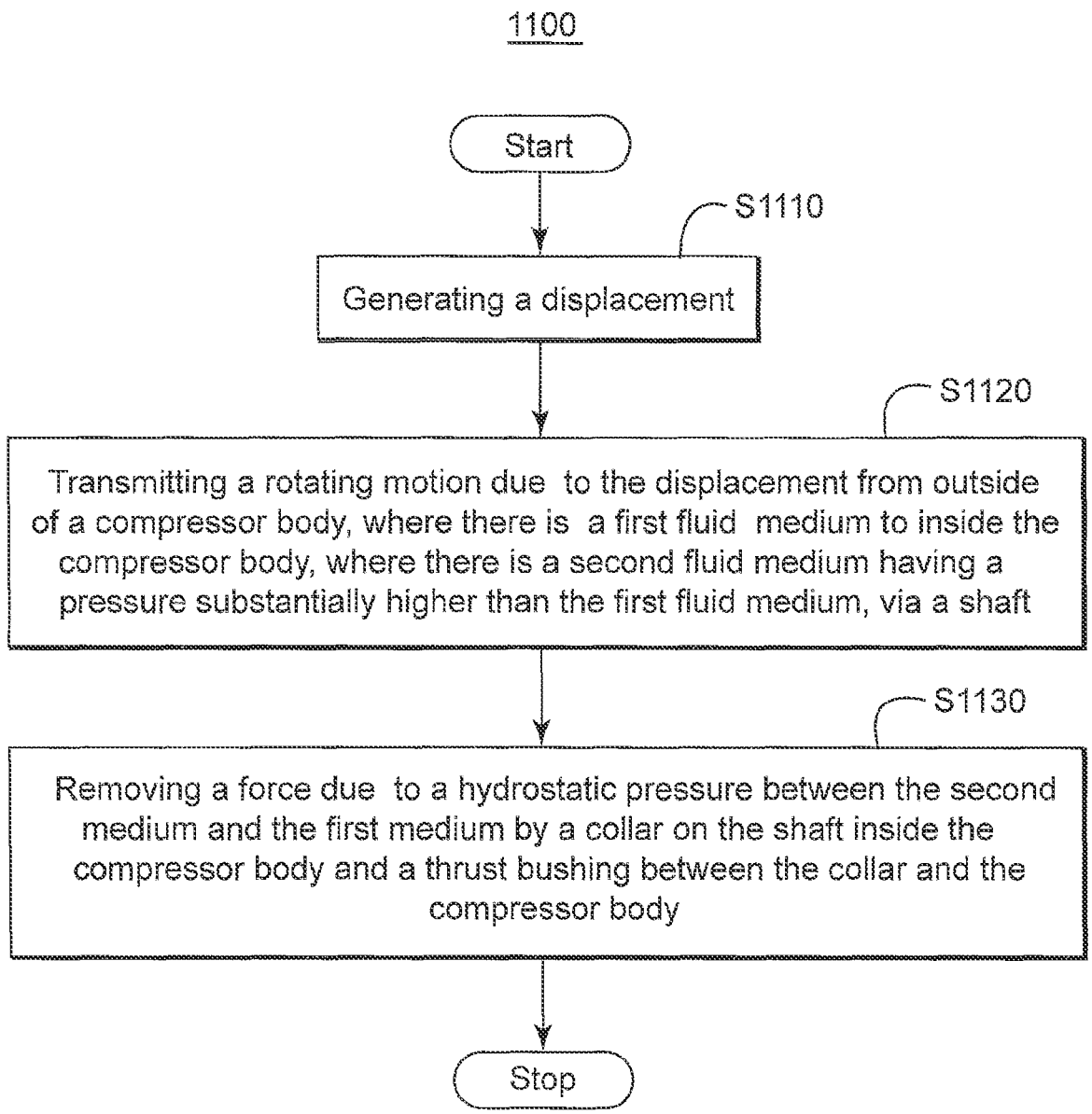

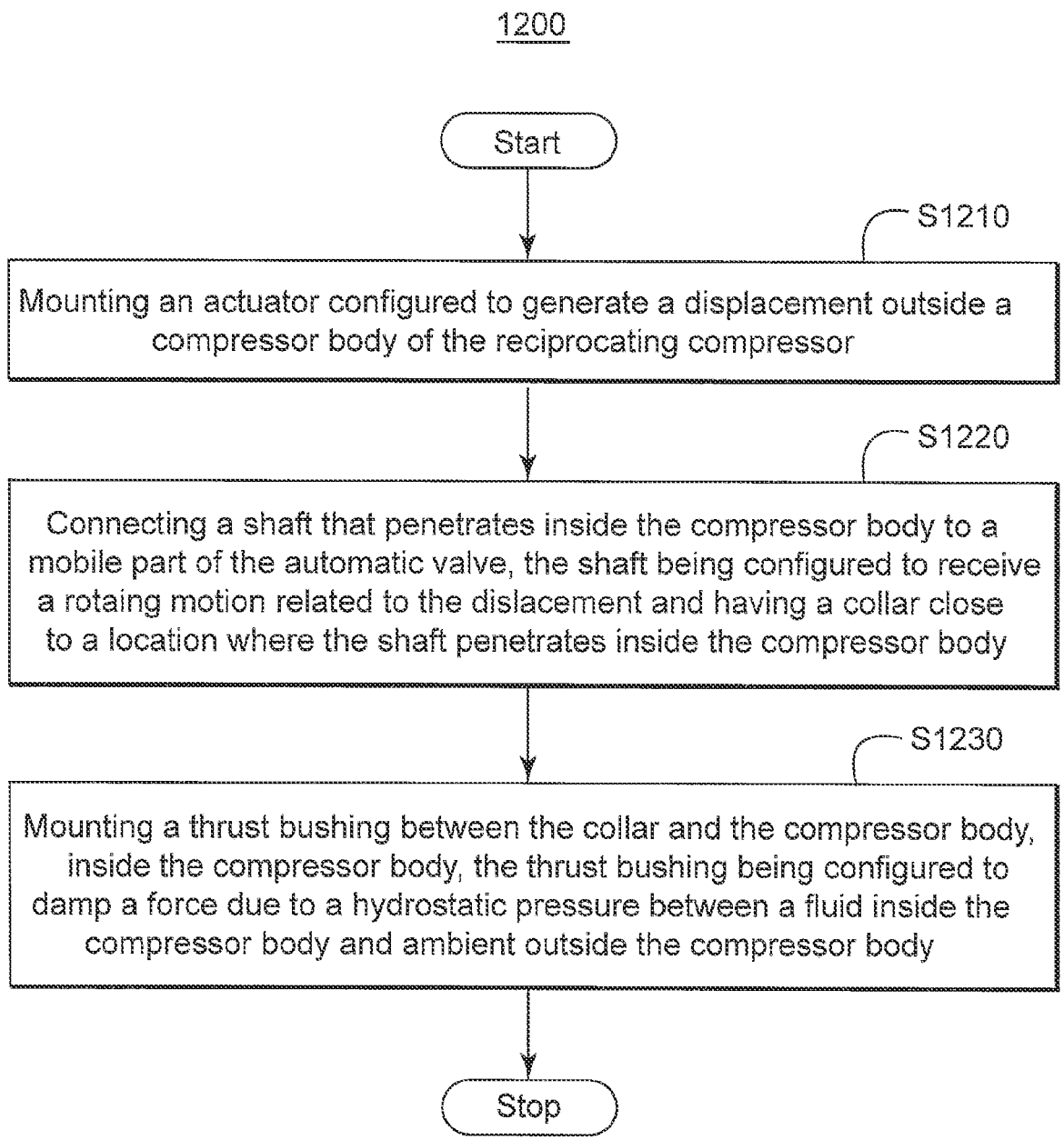

DEVICES AND METHODS FOR ACTUATING VALVES

BACKGROUND

Technical Field

Embodiments of the subject matter disclosed herein generally relate to devices and methods configured to carry hydrostatic pressure in reciprocating compressors that have actuated valves and are used in oil and gas industry.

Discussion of the Background

Compressors are mechanical devices that increase the pressure of a gas and can be found in engines, turbines, power generation, cryogenic applications, oil and gas processing, etc. Due to their widespread use, various mechanisms and techniques related to compressors are often subject to research for improving the compressor efficiency and solving problems related to specific operating environments. One particular aspect that has to be considered for compressors used in oil and gas industry is that the compressed fluid is frequently corrosive and flammable. American Petroleum Institute (API), the organization setting the recognized industry standard for equipment used in oil and gas industry has issued a document, API618 (whose version as of June 2011 is included herewith by reference), listing a complete set of minimum requirements for reciprocating compressors.

The compressors may be classified as positive displacement compressors (e.g., reciprocating, screw, or vane compressors) or dynamic compressors (e.g., centrifugal or axial compressors). In the positive displacement compressors, the gas is compressed by trapping a fixed volume of gas and then reducing that volume. In the dynamic compressors, the gas is compressed by transferring the kinetic energy from a rotating element (such as, an impeller) to the gas to be compressed by the compressor.

FIG. 1 is an illustration of a conventional dual chamber reciprocating compressor 10 (i.e., a positive displacement compressor), which is used in oil and gas industry. The compression occurs in a cylinder 20. A fluid to be compressed (e.g., natural gas) is input into the cylinder 20 via an inlet 30, and, after the compression, it is output via an outlet 40. The compressor operates in a cyclical process during which the fluid is compressed due to a movement of the piston 50 in the cylinder 20, between a head end 26 and a crank end 28. The piston 50 divides the cylinder 20 in two compression chambers 22 and 24 operating in different phases of the cyclical process, the volume of compression chamber 22 being at its lowest value when the volume of the compression chamber 24 is at its highest value and vice-versa.

Suction valves 32 and 34 open to allow the fluid that is going to be compressed (i.e., having a first/suction pressure $p_1$) from the inlet 30 into the compression chambers 22 and 24, respectively. Discharge valves 42 and 44 open to allow the fluid that has been compressed (i.e., having a second/discharge pressure $p_2$) to be output from the compression chambers 22 and 24, respectively, via the outlet 40. The piston 50 moves due to energy transmitted from a crankshaft 60 via a crosshead 70 and a piston rod 80. Conventionally, the suction and the compression valves used in a reciprocating compressor are automatic valves that are switched between a close state (i.e. preventing fluid to pass therethrough) and an open state (i.e. allowing the fluid to pass there-through) due to a differential pressure across the valve.

A typical compression cycle includes four phases: expansion, suction, compression and discharge. When the compressed fluid is evacuated from a compression chamber at the end of a compression cycle, a small amount of fluid at the delivery pressure $p_2$ remains trapped in a clearance volume (i.e., the minimum volume of the compression chamber). During the expansion phase and the suction phase of the compression cycle, the piston moves to increase the volume of the compression chamber. At the beginning of the expansion phase, the delivery valve closes (the suction valve remaining closed), and then, the pressure of the trapped fluid drops since the volume of the compression chamber available to the fluid increases. The suction phase of the compression cycle begins when the pressure inside the compression chamber becomes equal to the suction pressure $p_1$, triggering the suction valve to open. During the suction phase, the compression chamber volume and the amount of fluid to be compressed (at the pressure $p_1$) increase until a maxim volume of the compression chamber is reached.

During the compression and discharge phases of the compression cycle, the piston moves in a direction opposite to the direction of motion during the expansion and compression phases, to decrease the volume of the compression chamber. During the compression phase both the suction and the delivery valves are closed, the pressure of the fluid in the compression chamber increasing (from the suction pressure $p_1$ to the delivery pressure $p_2$) because the volume of the compression chamber decreases. The delivery phase of the compression cycle begins when the pressure inside the compression chamber becomes equal to the delivery pressure $p_2$, triggering the delivery valve to open. During the delivery phase the fluid at the delivery pressure $p_2$ is evacuated from the compression chamber until the minimum (clearance) volume of the compression chamber is reached.

Using actuated valves instead of automatic valves (that open and close due to the differential pressure across the valve) may increase the efficiency and reduce the clearance volume. However, the use of actuated valves has not yet been developed due to the special technical requirements of a reciprocating compressor operating the oil and gas industry, that is, larger forces, larger displacements and shorter response times relative to those that currently available actuators provide. While some currently available actuators may meet one of these requirements, they cannot meet all of these conditions simultaneously. Additionally the corrosiveness and danger of damaging explosion associated with the use of reciprocating compressors in oil and gas industry further constrain the use of actuated valves, making it necessary to place the actuators outside the compressor.

Since the actuators are placed outside the reciprocating compressors, the large forces necessary for the actuator to move the valve closing member is in part due to a pressure differential between the fluid inside the reciprocating compressor and the ambient (known as hydrostatic pressure). Additionally, when electromagnetic actuators generate large forces in short actuation times, the actuators also generate a substantial amount of heat, which may be problematic to dissipate (and, in some instances, may even require a cooling system). Therefore, it would be beneficial if the forces necessary to actuate the valve were smaller.

Accordingly, it would be desirable to provide valve assemblies and methods to reduce the force necessary to actuate valves in reciprocating compressors.

SUMMARY

Various embodiments of the current inventive concept set forth apparatuses and methods overcoming the technical challenges in actuating valves of reciprocating compressors used in oil and gas industry. Specifically, various embodiments are configured to remove the effect of the hydrostatic pressure inside the compressor, thereby requiring lower actuation forces. Lower actuation forces makes it possible to use electromagnetic actuators that are capable to generate the necessary (lower) forces in short actuation times as required in reciprocating compressors used in the oil and gas industry, without having a heat dissipation problem.

According to one exemplary embodiment, a valve assembly useable in a reciprocating compressor for oil and gas industry includes an actuator, a shaft, a collar and a thrust bushing. The actuator is configured to generate a displacement. The shaft configured to receive a rotating motion caused by the displacement and to penetrate inside a compressor body of the reciprocating compressor. The collar is located close to a location where the shaft penetrates inside the compressor body. The thrust bushing is located between the collar and the compressor body. The rotating motion actuates a valve closing member of a valve inside the compressor body.

According to another exemplary embodiment, a method of actuating a valve inside a reciprocating compressor used in oil and gas industry includes generating a displacement, and transmitting, via a shaft, a rotating motion due to the displacement from outside of a compressor body where there is a first fluid medium, to inside the compressor body where there is a second fluid medium having a pressure substantially higher than the first fluid medium. Further, the method includes removing a force due to a hydrostatic pressure between the second medium and the first medium by using a collar on the shaft inside the compressor body and a thrust bushing between the collar and the compressor body.

According to another exemplary embodiment, a reciprocating compressor used in oil and gas industry has (1) a compressor body configured to separate a fluid from ambient, and (2) a valve assembly configured to operate a valve on the compressor body. The valve assembly includes (A) an actuator located outside the compressor body and configured to generate a displacement, (B) a shaft configured to receive a rotating motion cause by the displacement and to penetrate inside a compressor body of the reciprocating compressor, (C) a collar located close to a location where the shaft penetrates inside the compressor body, and (D) a thrust bushing configured to reduce a force due to a hydrostatic pressure between the fluid and ambient. The rotating motion actuates a valve closing member of the valve.

According to another exemplary embodiment, a method of retrofitting a reciprocating compressor initially having an automatic valve is provided. The method includes mounting an actuator configured to generate a displacement outside a compressor body of the reciprocating compressor, connecting a shaft that penetrates inside the compressor body to a valve closing member of the automatic valve, the shaft being configured to receive a rotating motion due to the displacement and having a collar close to a location where the shaft penetrates inside the compressor body. The method further includes mounting a thrust bushing between the collar and the compressor body, inside the compressor body, the thrust bushing being configured to damp a force due to a hydrostatic pressure between a fluid inside the compressor body and ambient outside the compressor body.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 11 is a flow chart of a method of actuating a valve inside a reciprocating compressor used in oil and gas industry according to an exemplary embodiment; and FIG. 12 is a flow chart illustrating a method for retrofitting a reciprocating compressor used in oil and gas industry according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of reciprocating compressors with actuated valves used in oil and gas industry. However, the embodiments to be discussed next are not limited to these systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

One objective of embodiments described hereinafter is to provide apparatuses (i.e., valve assemblies) and methods that would enable using one or more actuated valves in reciprocating compressors. First, one has to consider whether to place the actuator inside or outside the compressor body.

Figure 1:
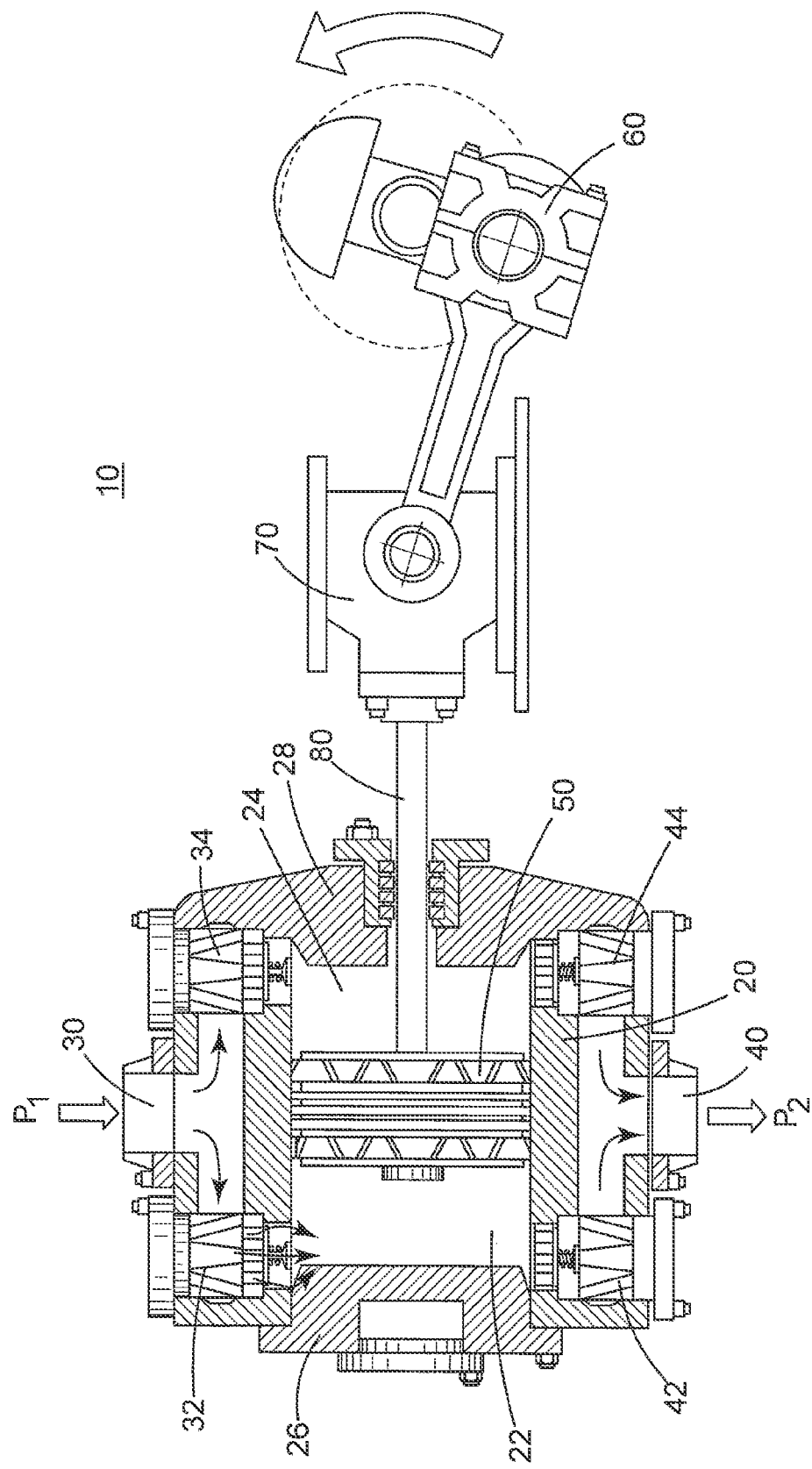
FIG. 1 is a schematic diagram of a conventional dual chamber reciprocating compressor.
Figure 2:
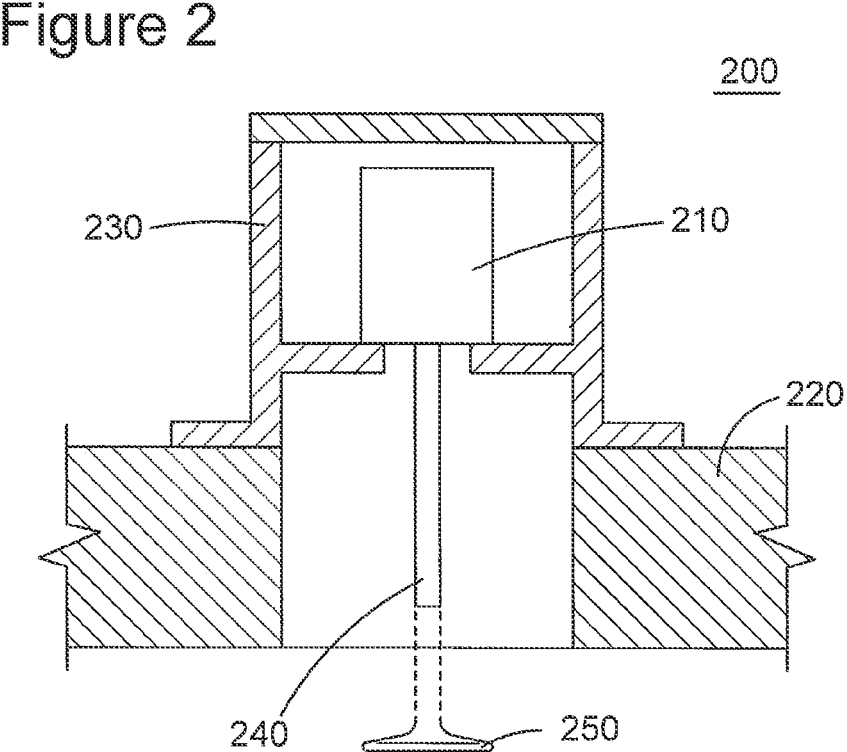
FIG. 2 is a schematic diagram illustrating a valve assembly with an actuator inside a compressor body.

In a first arrangement illustrated in FIG. 2, a valve assembly 200 includes an actuator 210 inside a compressor body 220, more specifically inside a cover 230 fluidly communicating with the compressor body 220 and configured to host the actuator 210. A stem 240 transmits a displacement and an associated actuating force to a valve closing member 250 (e.g., a disk, ball, plug or the like).

Figure 3:
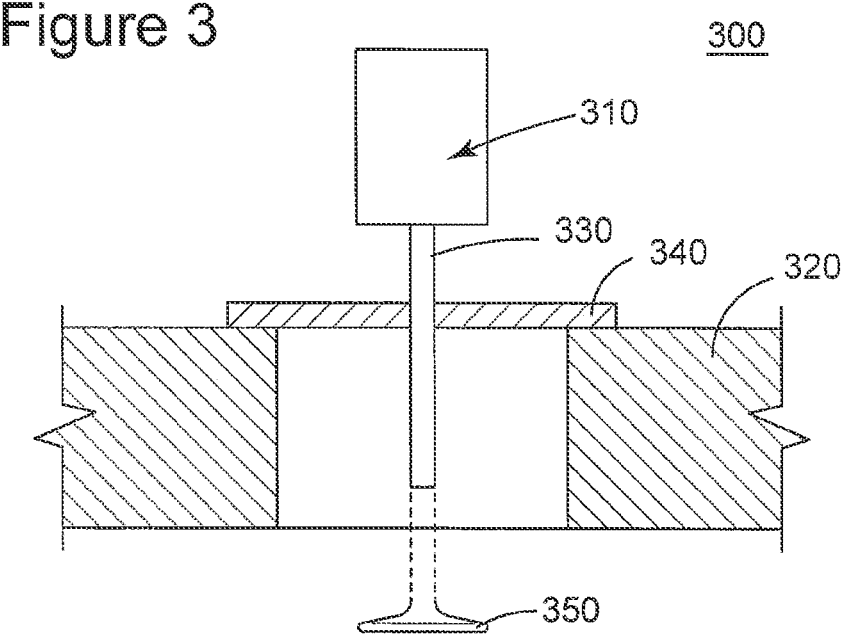
FIG. 3 is a schematic diagram illustrating a valve assembly with an actuator outside a compressor body.

Alternatively, as illustrated in FIG. 3, a valve assembly 300 includes an actuator 310 placed outside a compressor body 320. A stem 330 penetrates, for example, through a cover 340 inside the compressor body to actuate a valve closing member 350.

The actuators 210 and 310 may be linear actuators providing linear displacements or rotational actuators providing angular displacements. In the case of linear actuators, the magnitude of the actuating force transmitted from the actuator via an actuator shaft to the valve's moving part differs depending on whether the actuator is located inside the compressor body or outside thereof.

For the actuator 310 (i.e., linear actuator located outside the compressor body), the actuating force has to exceed a sum of a first force $F_1$ necessary to overcome the pressure difference across the valve, and a second force $F_2$ necessary to overcome the hydrostatic pressure, which is the difference between the fluid inside the compressor body and ambient pressure outside the compressor body. The first force $F_1$ is proportional with a surface of the valve's moving part 350, and the second force $F_2$ is proportional with a surface of the actuator shaft 330. Although, the surface of the actuator shaft 330 is substantially smaller than the surface of the valve's moving part 350, the pressure difference across the valve is substantially smaller than the hydrostatic pressure (e.g., 1 bar vs. 300 bar). This actuating force may be larger than the force that currently available actuators are capable to provide in the required short actuation time (e.g., about 5 ms) and for a relatively large displacement (e.g., about 10-15 mm).

For the actuator 210 (i.e., linear actuator located inside the compressor body), the actuating force is smaller than the actuating force required for the actuator 310, because the actuating force has only to overcome the first force $F_1$ due to the pressure difference across the valve.

However, when the actuator is located inside the compressor body there are additional technical problems that must be overcome, particularly when the fluid to be compressed is corrosive and flammable. The internal parts of the actuators require special coating and sealing to prevent damage due to the corrosive fluid, which it may be difficult to dissipate heat. Operating an actuator inside the compressor body, in particular, if the actuator is an electric actuator, in such a flammable environment is not safe due to the imminent danger of explosion produced by sparks related to the actuator.

Thus, in order to avoid the danger of explosion of the compressed fluid (e.g., natural gas), the (one or more) actuators configured and connected to operate valve closing members of the (one or more) valves are, in an embodiment, mounted outside the compressor body, so that the actuators are not in direct contact with the corrosive and flammable fluid.

Figure 4:
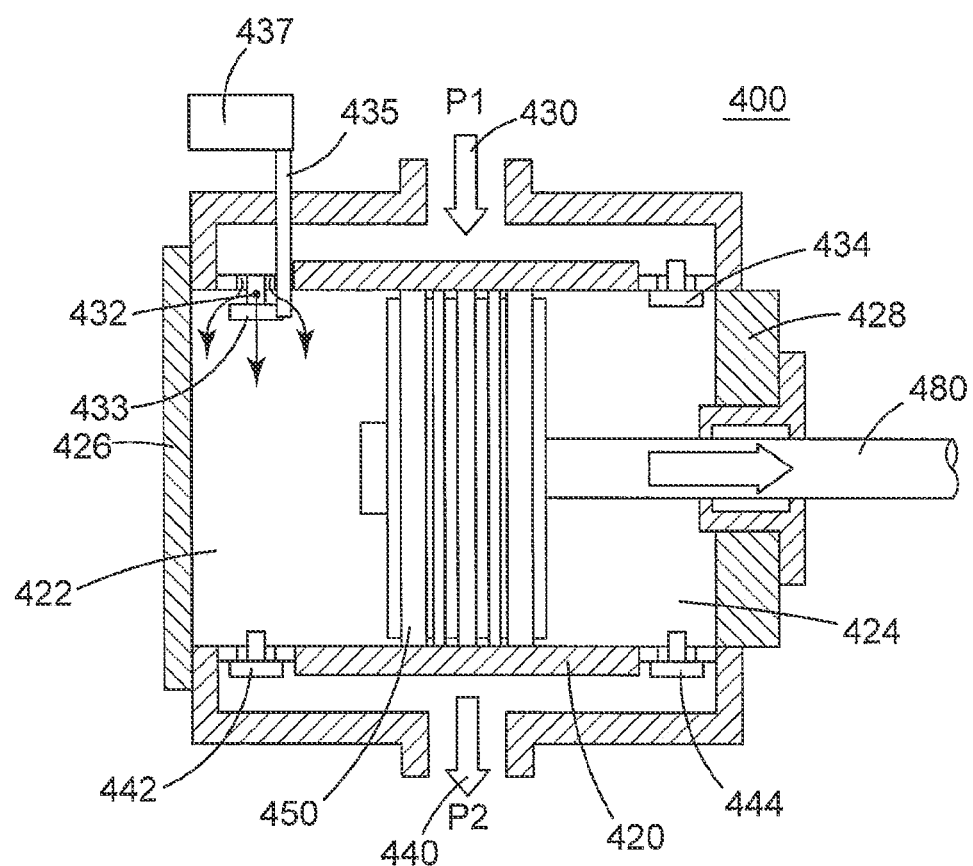
FIG. 4 is a schematic diagram of a reciprocating compressor according to an exemplary embodiment.

FIG. 4 is a schematic representation of a reciprocating compressor 400 having one or more actuated valves. The compressor 400 is a dual chamber reciprocating compressor. However, valve assemblies according to embodiments similar to the ones illustrated in FIGS. 5-10 may be used also in single chamber reciprocating compressors. The compression occurs in a cylinder 420. A fluid to be compressed (e.g., natural gas) is input into the cylinder 420 via an inlet 430, and, after the compression, is output via an outlet 440. The compression occurs due to the back-and-forth movement of the piston 450 along the cylinder 420, between a head end 426 and a crank end 428. The piston 450 divides the cylinder 420 in two compression chambers 422 and 424 operating in different phases of the cyclic process, the volume of compression chamber 422 being at its lowest value when the volume of the compression chamber 424 is at its highest value and vice-versa.

Suction valves 432 and 434 open to allow the fluid that is going to be compressed (i.e., having a first pressure $P_1$) from the inlet 430 into the compression chambers 422 and 424, respectively. Discharge valves 442 and 444 open to allow the fluid that has been compressed (i.e., having a second pressure $P_2$) to be output from the compression chambers 422 and 424, respectively, via the outlet 440. The piston 450 moves due to energy received for example from a crankshaft (not shown) via a crosshead (not shown) and a piston rod 480. In FIG. 3, the valves 432, 434, 442, and 444 are illustrated as being located on a lateral wall of the cylinder 420. However, the valves 432 and 442, 434 and 444, may be located on the head end 426 or the crank end 428 of the cylinder 420, respectively.

In contrast to an automatic valve, which is open depending on a differential pressure on opposite sides of a valve closing member of the valve, an actuated valve, such as 432 in FIG. 4, opens when an actuator, such as 437 in FIG. 4, applies a force transmitted via a stem 435 to a valve closing member 433 of the valve 432, thereby inducing a linear or an angular displacement of the valve closing member 433. The stem 435 is not intended to limit the manner in which the actuating motion is transmitted from the actuator 437 to the valve closing member; other motion transmission and conversion mechanisms may be employed for this purpose instead of the stem 435. One or more valves of the reciprocating compressor 400 may be actuated valves. A combination of actuated valves and automatic valves may also occur in some embodiments; for example, the suction valves may be actuated while the discharge valves may be automatic valves.

Figure 5:
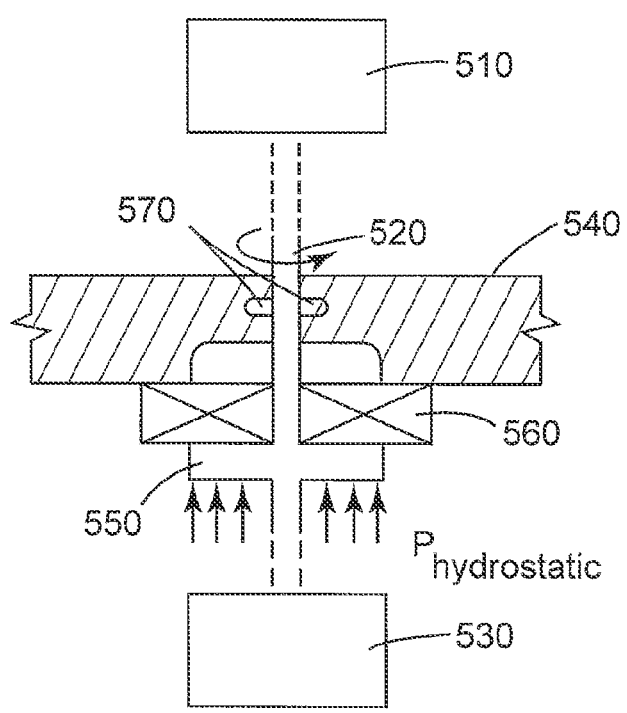
FIG. 5 is a schematic diagram of a valve assembly configured to carry hydrostatic pressure according to an exemplary embodiment.

One or more actuated valves (e.g., 432 in FIG. 4) include a valve assembly configured to carry a hydrostatic pressure such as the valve assembly 500 illustrated in FIG. 5. An actuator 510 generates a (linear or angular) displacement and transmits it via a stem 520 to a valve closing member 530. The stem 520 penetrates inside the compressor body 540. Close to a penetration location, and inside the compressor body 540, the stem 520 has a collar 550 (i.e., a portion with a larger diameter). The valve assembly 500 further includes a bushing 560 located between the collar 550 and the compressor body 540. One or more dynamic seals 570 (e.g., labyrinth seals) located between the compressor body 540 and the shaft 520 prevent the fluid from inside the compressor body 540 to escape in the ambient.

Various mechanical components may be used between the actuator 510 and a location where the stem 520 penetrates inside the compressor body 540 or between the location where the stem 520 penetrates inside the compressor body 540 and the valve closing member 530 to amplify and/or to convert between linear and angular displacement, the displacement generated by the actuator 540. At the location where the stem 520 penetrates the compressor body 540, the stem 520 performs a rotating motion (i.e., related to an angular displacement). These various components are not illustrated with specificity in FIG. 5 (being suggested by the dashed lines), but their embodiments are illustrated and described relative to FIGS. 6-10.

At the location where the shaft 520 enters the compressor body 540, the hydrostatic pressure pushes the collar 550 towards the bushing 560, thereby carrying the hydrostatic pressure without affecting the rotating motion of the shaft 520.

Figure 6:
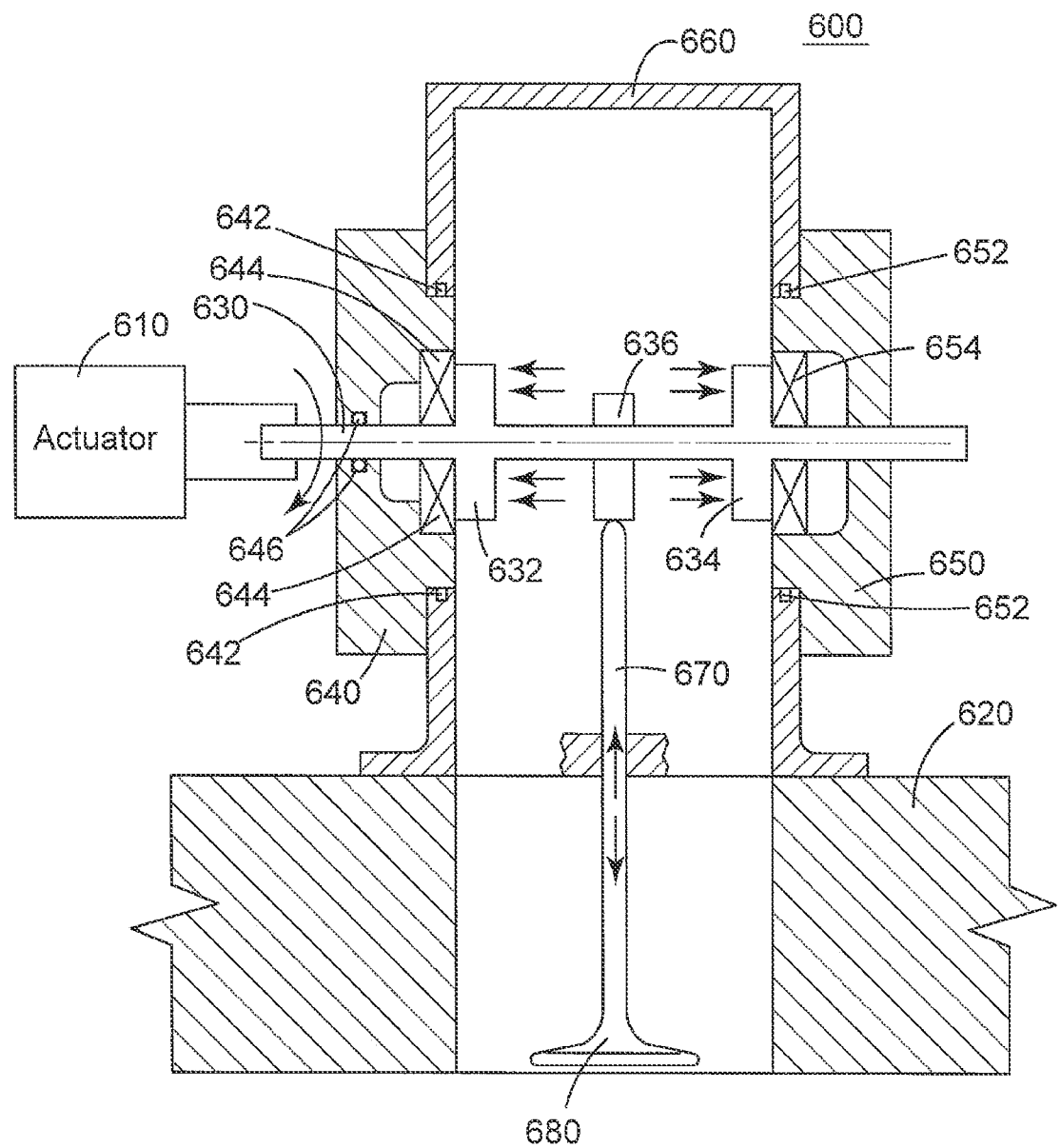
FIG. 6 is a schematic diagram of a valve assembly according to an exemplary embodiment.

FIG. 6 is a schematic representation of a valve assembly 600, according to an exemplary embodiment. An actuator 610 located outside a compressor body 620, is configured to provide an angular displacement to a stem 630 penetrating inside the compressor body 620.

The stem 630 has collars 632 and 634 close to cover shaft supports 640 and 650, respectively. The cover supports 640 and 650 together with a cover 660 are assembled to house and support the valve assembly 600. Static seals 642 and 652 (e.g., O-rings) located between the cover supports 640 and 650, respectively, and the cover 660 ensure that the high pressure fluid inside the compressor body does not leak outside thereof.

A thrust bearing 644 located between the collar 632 and the cover shaft support 640 is configured to carry the force due to the hydrostatic pressure. One or more dynamic seals 646 (e.g., labyrinth seals) located between the shaft 630 and the cover 660 ensure that the high pressure fluid does not leak outside the compressor.

A cam 636 is mounted on the shaft 630, between the collars 632 and 634. For easing installation, at least one of the collars 632 and 634 may be removable from the shaft 630, although the collars 632 an 634 are fixedly attached during the operation (e.g., one of the collars may be formed as one piece with the shaft 630). The cam 636 has an asymmetric shape relative to the rotation axis of the shaft 630. The cam 636 is configured to be in contact with an stem 670, which is connected to a valve closing member 680 of a linear valve (e.g., a popper valve or a ring valve). Due to the shape of the cam 636, a rotation displacement transmitted by the actuator 610 to the shaft 630 is converted into a linear displacement of the valve's closing member 680.

Thus, in the assembly 600, the shaft 630 carries an angular displacement generated by the actuator 610, which is located outside the compressor body. The collar 632 and the thrust bushing 644 are configured to carry the hydrostatic pressure such that it does not affect transmission of this displacement.

Figure 7:
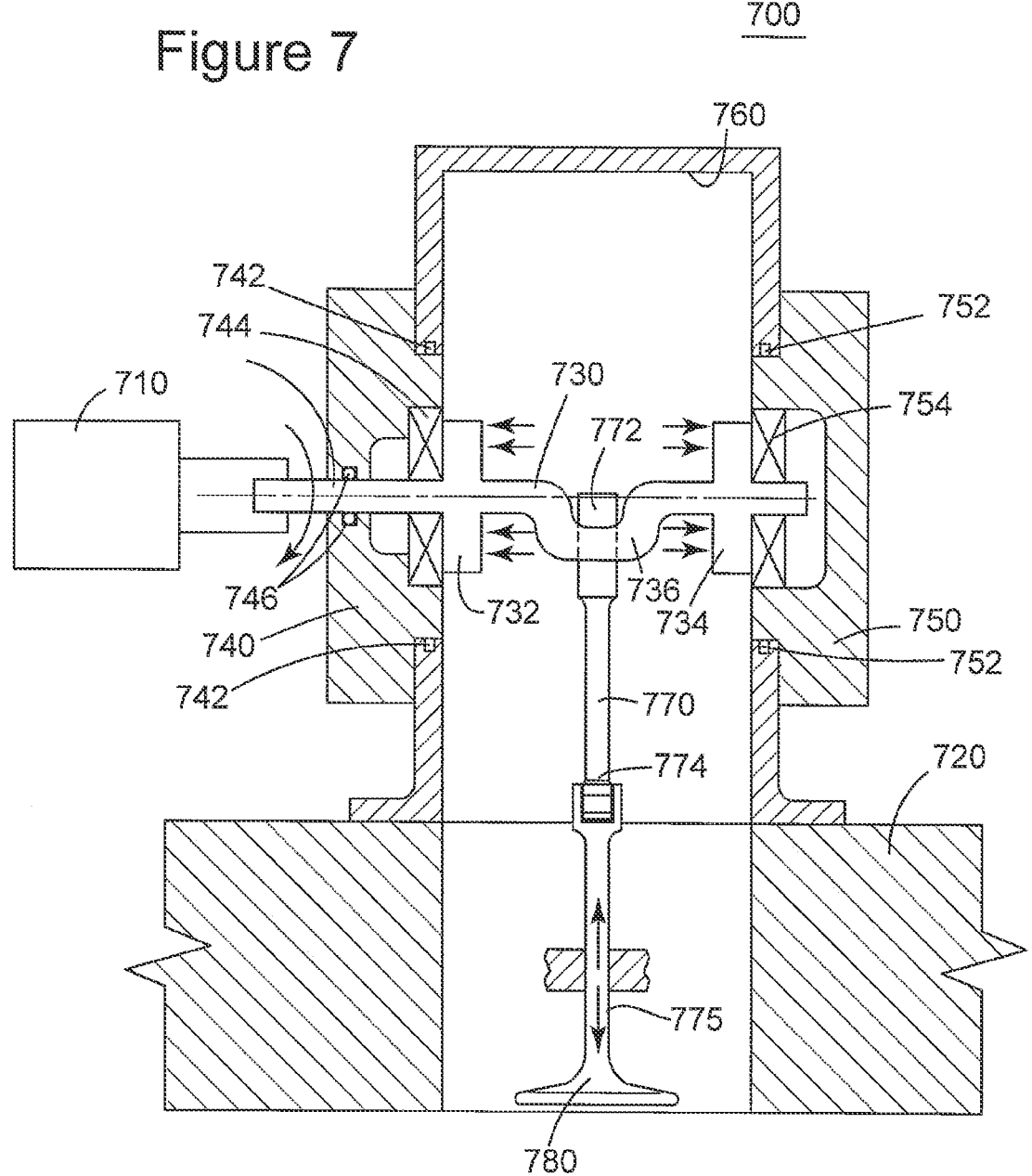
FIG. 7 is a schematic diagram of a valve assembly according to another exemplary embodiment.

FIG. 7 is a schematic representation of a valve assembly 700, according to another exemplary embodiment. Some components of the valve assembly 700 are similar to components of the valve assembly 600 in FIG. 6, and, therefore, have similar labels increased by 100 (for example, collar 632 in FIG. 6 and collar 732 in FIG. 7) and are not described again to avoid repetition. However, even the similar components may have substantially different characteristics. The actuator 610 located outside the compressor body 620, is configured to provide an angular displacement to a shaft 730 penetrating inside the compressor body 620. The shaft 730 has collars 732 and 734 close to the cover shaft supports 640 and 650. The cover supports 640 and 650 together with a cover 660 are assembled to house and support the valve assembly 700.

The shaft 730 is configured to have a portion 736 substantially parallel to a rotation axis of the shaft, but at a predetermined significant (i.e., visible, affecting motion of parts attached to this portion) distance from the axis. A connecting rod 770 is attached to the portion 736. An end 772 of the connecting rod 770 towards the portion 736 rotates with the portion 736, while the opposite end 774 connected to an stem 775 has a linear displacement. The linear displacement is transmitted to the valve's valve closing member 680 via the stem 775.

Thus, in the assembly 700, the shaft 730 carries an angular displacement from the actuator 610, which is located outside the compressor body 620. The collar 632 and the thrust bushing 644 are configured to carry the hydrostatic pressure such that it does not affect transmission of this angular displacement.

Figure 8:
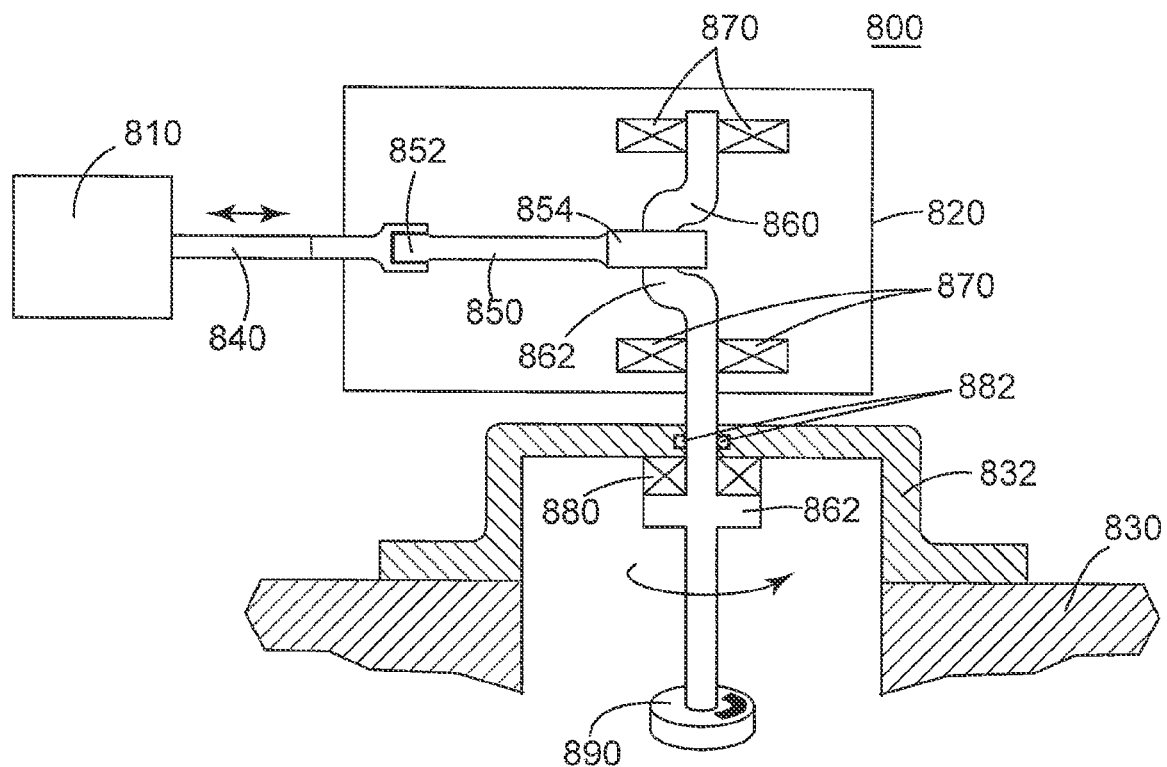
FIG. 8 is a schematic diagram of a valve assembly according to another exemplary embodiment.

FIG. 8 is a schematic representation of a valve assembly 800, according to another exemplary embodiment. In the valve assembly 800, a linear displacement generated by an actuator 810 is converted into an angular displacement (i.e., rotating motion) by a linear-to-rotational convertor 820. The linear-to-rotational converter may be designed (i.e. the relative dimensions of the components may be such that) to amplify the displacement generated by the actuator 810. Both the actuator 810 and the linear-to-rotational convertor 820 are placed outside a compressor body 830. In FIG. 8, the actuator 810 is illustrated separate from the linear-to-rotational converter 820. However, in an alternative embodiment, the actuator 810 and components of the linear-to-rotational converter 820 may be mounted inside the same housing.

The linear displacement generated by the actuator 810 is transmitted via an actuator shaft 840 to a connector rod 850 towards a rotating shaft 860. The connector rod 850 has one end 852 attached to the actuator shaft 840 and an opposite end 854 attached to a portion 862 of the shaft 860. The shaft 860 is configured to rotate around an axis substantial parallel but at a significant distance from the portion 862. Due to the shape of the shaft 860 and the manner in which the connecting rod 850 moves, the linear displacement is converted into an angular displacement (i.e., rotating motion) of the shaft 860. Inside the linear-to-rotational converter 820, the shaft 860 may be supported by bearings 870.

The shaft 860 is configured to penetrate inside the compressor body 830, where an end of the shaft 860 is connected to a moving part 890 of a rotating valve. The shaft 860 has a collar 864. A thrust bearing 880 being located between the collar 864 and a cover 832 of the compressor body 830 damps a force due to the hydrostatic pressure. Dynamic seals 882 located between the cover 832 and the shaft 860 prevent the fluid inside the compressor body 830 from leaking outside thereof.

Thus, in the assembly 800, the shaft 860 transmits an angular displacement inside the compressor body 830, while the collar 832 and the thrust bushing 844 are configured to carry the hydrostatic pressure such that it does not affect transmission of this angular displacement.

Figure 9:
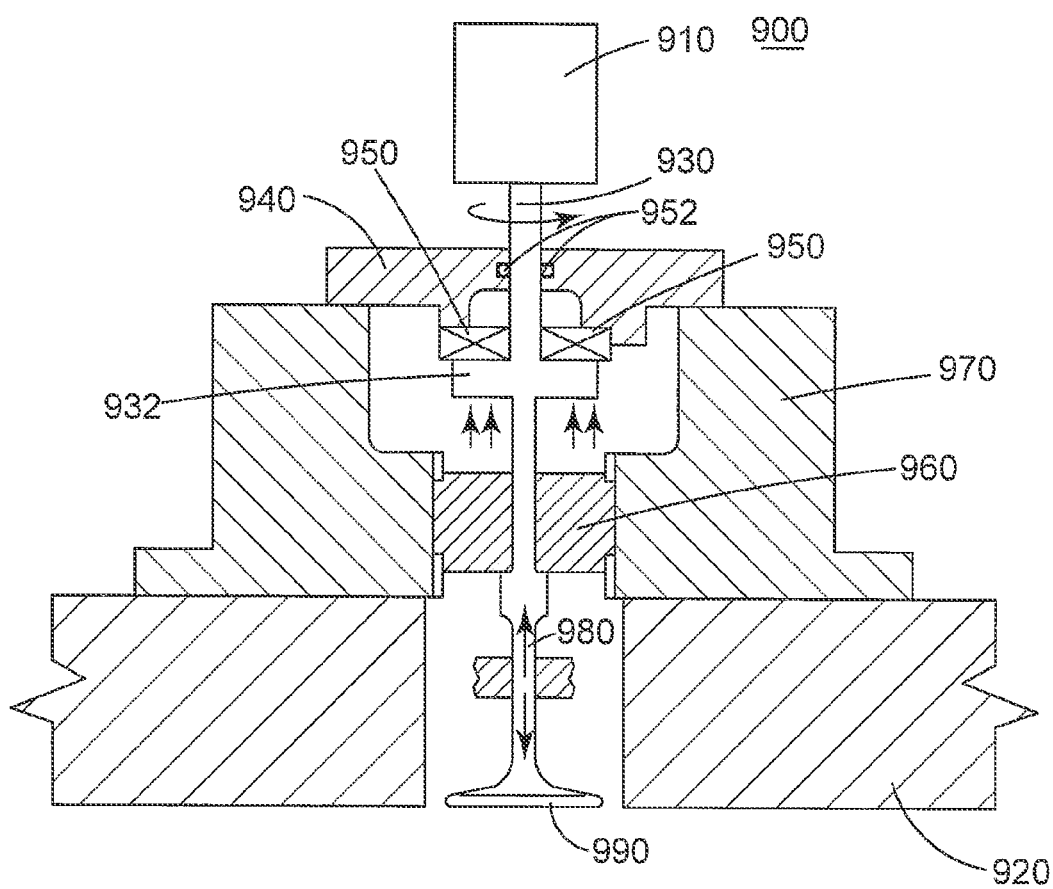
FIG. 9 is a schematic diagram of a valve assembly according to another exemplary embodiment.

FIG. 9 is a schematic representation of a valve assembly 900, according to another exemplary embodiment. An actuator 910 located outside a compressor body 920 provides an angular displacement (i.e., rotating motion) to a shaft 930. The shaft 930 penetrates through a cover 940 towards an inside of the compressor body 920. The shaft 930 has a collar 932 that is pushed due to the hydrostatic pressure towards a thrust bearing 950 located between the collar 932 and the cover 940. The thrust bearing 950 damps a force due to the hydrostatic pressure. Dynamic seals 952 located between the cover 940 and the shaft 930 prevent the fluid inside the compressor body 920 from leaking outside thereof.

Inside the compressor body 920, the angular displacement of the shaft 930 is converted into a linear displacement by a screw-jack mechanism 960. The screw-jack mechanism 960 is fixedly attached to a screw-jack cover 970 located between the cover 940 and the cylinder body 920. The screw-jack mechanism 960 has an interior thread and the shaft 930 has an exterior thread, thereby, the angular displacement being converted into a linear displacement. For example, the screw-jack mechanism 960 may push in a linear motion an actuator shaft 980 attached to a valve closing member 990 of a linear valve (e.g., a poppet valve or a ring valve).

Thus, in the assembly 900, the shaft 930 transmits an angular displacement generated by the actuator 910, which is located outside the compressor body. The collar 932 and the thrust bushing 950 are configured to carry the hydrostatic pressure such that it does not affect transmission of this displacement.

Figure 10:
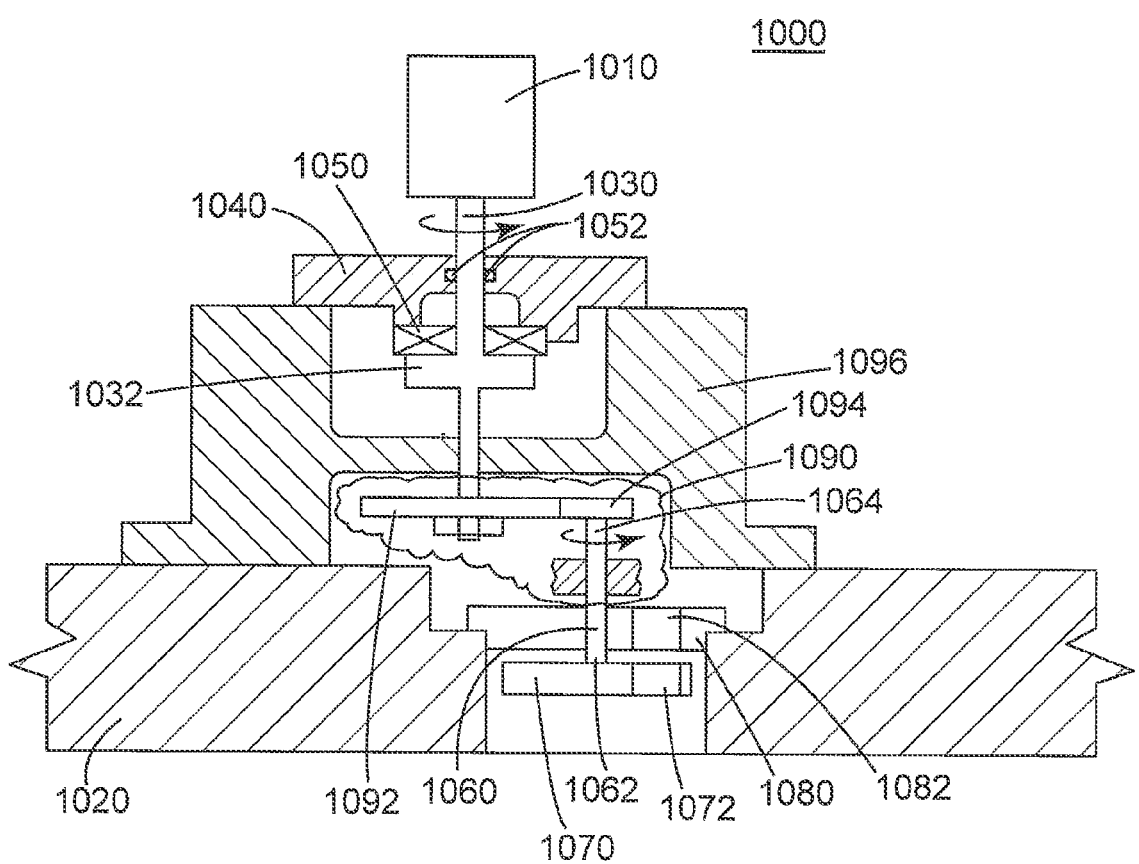
FIG. 10 is a schematic diagram of a valve assembly according to another exemplary embodiment.

FIG. 10 is a schematic representation of a valve assembly 1000, according to yet another exemplary embodiment. An actuator 1010 located outside a compressor body 1020 provides an angular displacement to a shaft 1030. The shaft 1030 penetrates inside the compressor body through a cover 1040. The shaft 1030 has a collar 1032 with a diameter lager than the shaft's diameter along most of its length. A thrust bearing 1050 located between the collar 1032 and the cover 1040 damps a force due to the hydrostatic pressure. Dynamic seals 1052 located between the cover 1040 and the shaft 1030 prevent the fluid inside the compressor body 1020 from leaking outside thereof.

Further, the valve assembly 1000 includes an actuator shaft 1060 at a first end 1062 of which a valve closing member 1070 of a rotary valve is attached. The rotary valve also includes a static seat (stator) 1080. When, in a first position, an opening 1082 through the valve seat 1080 overlaps an opening 1072 through the rotary valve 1070 the valve is open. By rotating the valve closing member 1070 of the rotary valve relative to the valve seat 1080 in a second position, the openings 1072 and 1082 no longer overlap and the valve is closed.

Thus, the shaft 1030 carries an angular displacement from the actuator 1010 which is located outside the compressor body. The collar 1032 and the thrust bushing 1044 are configured to carry the hydrostatic pressure such that it does not affect transmission of this angular displacement.

To summarize, FIGS. 5-10 illustrate valve assemblies useable in reciprocating compressor for oil and gas industry. These valve assemblies include actuators located outside the compressor body connected to a shaft penetrating inside the compressor body that transmits an angular displacement (rotating motion). Inside the compressor body, close to the location where the shaft penetrates inside the compressor body, a thrust bushing and a collar of the shaft damp a force due to hydrostatic pressure (between the fluid inside the compressor body and the ambient outside thereof) so that is does not affect transmission of the rotating motion (i.e., the angular displacement). In this way, the hydrostatic pressure does not affect the actuator. Moreover, the actuator being outside the compressor body no special coatings and sealing are necessary.

A flow chart of a method 1100 of actuating a valve inside a reciprocating compressor used in oil and gas industry according to an exemplary embodiment is illustrated in FIG. 11. The method 1100 includes generating a displacement, at S1110, and transmitting, via a shaft, a rotating motion due to the displacement from outside of a compressor body, where there is a first fluid medium, to inside the compressor body, where there is a second fluid medium having a pressure substantially higher than the first fluid medium, at S1120. Further the method 1100 includes damping a force due to a hydrostatic pressure between the second medium and the first medium by using a collar on the shaft inside the compressor body and a thrust bushing between the collar and the compressor body, at S1130.

The method 1100 may also include dynamically sealing an interface between the shaft and the compressor body at the location where the shaft penetrates inside the compressor body. If the displacement is an angular displacement causing the rotating motion and the valve is a linear valve, the method 1100 may further include converting the angular displacement into a linear displacement to actuate the valve closing member of the linear valve inside the compressor body. If the displacement is a linear displacement, the method 1100 may further include converting the linear displacement into the rotating motion outside the compressor body.

The method 1100 may also include (1) amplifying the displacement between the actuator and the shaft, outside the compressor body, and/or (2) amplifying the rotating motion between the shaft and the valve closing member of the valve, inside the compressor body.

A reciprocating compressor with automatic valves used in the oil and gas industry may be retrofit so that one or more of the valves to become actuated valves with valve assemblies configured to carry forces due to hydrostatic pressure. A flow chart of a method 1200 of retrofitting a reciprocating compressor having an automatic valve operated based on a differential pressure across a valve closing member of the valve is illustrated in FIG. 12. The method 1200 includes mounting an actuator configured to generate a displacement outside a compressor body of the reciprocating compressor at S1210. Further the method 1200 includes, at S1220, connecting a shaft that penetrates inside the compressor body to a valve closing member of the automatic valve, the shaft being configured to receive a rotating motion related to the displacement and having a collar close to a location where the shaft penetrates inside the compressor body. Finally, at S1230, the method 1200 includes mounting a thrust bushing between the collar and the compressor body, inside the compressor body, the thrust bushing being configured to damp a force due to a hydrostatic pressure between a fluid inside the compressor body and ambient outside the compressor body.

The method 1200 may also include mounting one or more dynamic seals at an interface between the shaft and the compressor body at the location where the shaft penetrates inside the compressor body. If the displacement is an angular displacement, and the valve is a linear valve, the method 1200 may further include mounting a displacement transmission mechanism inside the compressor body, the displacement transmission mechanism being configured to convert the angular displacement causing the rotating motion into a linear displacement, in order to actuate the valve closing member of the linear valve. If the actuator generates a linear displacement, the method 1200 may further include mounting a linear-to-rotational convertor between the actuator and the shaft, outside the compressor body, the linear-to-rotational convertor being configured to convert the linear displacement into the rotating motion.

In order to enhance valve actuation, the method 1200 may also include (1) mounting a displacement amplification mechanism between the actuator and the shaft, the displacement amplification mechanism being configured to amplify the displacement, and/or (2) mounting a displacement amplification mechanism between the shaft and the valve closing member of the valve, the displacement amplification mechanism being configured to amplify the rotating motion.

The disclosed exemplary embodiments provide valve assemblies configured such that a force due to the hydrostatic pressure does not affect transmission of a displacement from an actuator located outside the compressor body to a valve closing member of a valve inside the compressor body. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A valve assembly useable in a reciprocating compressor for the oil and gas industry, the valve assembly comprising:
    an actuator configured to generate an angular displacement;
    a shaft configured to receive a rotating motion caused by the angular displacement and to penetrate inside a compressor body of the reciprocating compressor, the shaft comprising two collars located inside the compressor body;
    a displacement transmission mechanism located inside the compressor body and configured to convert the angular displacement causing the rotating motion into a linear displacement to actuate a valve closing member of a linear valve inside the compressor body; and
    two thrust bushings or bearings that are each sandwiched between a respective one of the two collars and one of two opposing surfaces inside the compressor body to dampen a force acting on the collar inside the compressor body due to hydrostatic pressure inside the compressor body such that said force does not affect transmission of the angular displacement.

2. The valve assembly of claim 1, further comprising:
    one or more dynamic seals at an interface between the shaft and the compressor body at the location where the shaft penetrates inside the compressor body.

3. The valve assembly of claim 1, wherein the displacement transmission mechanism comprises a cam mounted to the shaft and having an asymmetric shape relative to the shaft, the cam positioned to engage the valve closing member to convert the angular displacement of the shaft to the linear displacement of the valve closing member.

4. The valve assembly of claim 1, wherein the shaft, the collar, the displacement transmission mechanism and the thrust bushing or bearing are further located inside a volume underneath a cover attached to the compressor body, said volume in fluid communication with a chamber defined within the compressor body, said chamber housing the valve closing member.

5. A reciprocating compressor used in oil and gas industry, the reciprocating compressor comprising:
    a compressor body configured to separate a fluid from ambient; and at least one valve assembly configured to operate a valve on the compressor body, the at least one valve assembly comprising:
    an actuator located outside of the compressor body and configured to generate a displacement;
    a shaft configured to receive a rotating motion caused by the angular displacement and to penetrate inside the compressor body of the reciprocating compressor, the shaft comprising two collars located inside the compressor body;
    a displacement transmission mechanism located inside the compressor body and configured to convert the angular displacement causing the rotating motion into a linear displacement to actuate a valve closing member of a linear valve inside the compressor body; and
    two thrust bushings or bearings that are each sandwiched between a respective one of the two collars and one of two opposing surfaces inside the compressor body to dampen a force acting on the collar inside the compressor body due to hydrostatic pressure inside the compressor body such that said force does not affect transmission of the angular displacement.

6. The reciprocating compressor of claim 5, further comprising:
    one or more dynamic seals located between the shaft and the compressor body at the location where the shaft penetrates inside the compressor body.

7. The reciprocating compressor of claim 5, wherein the displacement transmission mechanism comprises a cam mounted to the shaft and having an asymmetric shape relative to the shaft, the cam positioned to engage the valve closing member to convert the angular displacement of the shaft to the linear displacement of the valve closing member.

8. The reciprocating compressor of claim 5, wherein:
    the actuator generates a linear displacement, and
    the valve assembly further comprises a linear-to-rotational convertor located between the actuator and the shaft outside the compressor body configured to convert the linear displacement into the rotating motion.

9. The reciprocating compressor of claim 5, further comprising:
    a displacement amplification mechanism located between the actuator and the shaft and configured to amplify the displacement, or located between the shaft and the valve closing member of the valve and configured to amplify the rotating motion.

10. The valve assembly of claim 5, wherein the shaft, the collar, the displacement transmission mechanism and the thrust bushing or bearing are further located inside a volume underneath a cover attached to the compressor body, said volume in fluid communication with a chamber defined within the compressor body, said chamber housing the valve closing member.

* * * * *